US011191087B2

United States Patent
Gilson et al.

(10) Patent No.: US 11,191,087 B2
(45) Date of Patent: Nov. 30, 2021

(54) OPTIMIZING RESOURCES IN DATA TRANSMISSION

(71) Applicant: Comcast Cable Communications, LLC, Philadelphia, PA (US)

(72) Inventors: Ross Gilson, Philadelphia, PA (US);
Mark Francisco, Clarksburg, NJ (US);
David Urban, Downington, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/746,549

(22) Filed: Jan. 17, 2020

(65) Prior Publication Data
US 2021/0007110 A1 Jan. 7, 2021

Related U.S. Application Data

(63) Continuation of application No. 15/886,654, filed on Feb. 1, 2018, now Pat. No. 10,582,515, which is a continuation of application No. 14/722,981, filed on May 27, 2015, now Pat. No. 9,918,326.

(51) Int. Cl.
*H04L 12/28* (2006.01)
*H04W 72/08* (2009.01)
*H04W 72/04* (2009.01)
*H04W 72/00* (2009.01)

(52) U.S. Cl.
CPC ....... *H04W 72/085* (2013.01); *H04W 72/048* (2013.01); *H04W 72/005* (2013.01)

(58) Field of Classification Search
CPC . H04L 12/28; H04L 12/2801; H04L 12/2872; H04L 27/0012; H04L 27/12; H04L 27/2053; H04L 27/36; H04L 27/362; H04L 29/08945; H04L 41/08; H04L 41/0803; H04L 41/0806; H04L 41/0816; H04L 67/30; H04L 67/303; H04L 67/306; H04B 7/15521; H04W 28/065; H04W 72/005; H04W 72/04; H04W 72/048;
(Continued)

(56) References Cited

U.S. PATENT DOCUMENTS

| 6,891,858 B1 | 5/2005 | Mahesh et al. |
| 8,473,995 B2 | 6/2013 | Beser |
| 9,178,765 B2 | 11/2015 | Ling et al. |

(Continued)

OTHER PUBLICATIONS

Cable Television Laboratories, Inc., Data-Over-Cable Service Interface Specifications DOCSIS® 3.1, Physical Layer Specification, CM-SP-PHYv3.1-I07-150910, 244 pages, Sep. 10, 2015.*

*Primary Examiner* — Frank Duong
(74) *Attorney, Agent, or Firm* — Ballard Spahr LLP

(57) ABSTRACT

Methods and systems for providing data are disclosed. An optimal set of subcarriers can be determined for a data transmission when a plurality of devices have requested the data transmission. The optimal set of subcarriers can be determined based on similarities or differences between parameters assigned to subcarriers in capability profiles. Capacity loss and other information can be determined based on the similarities or the differences among corresponding parameters of the capability profiles. The data transmission can be transmitted to the plurality of devices via the optimal set of subcarriers.

32 Claims, 6 Drawing Sheets

(58) Field of Classification Search
CPC ............... H04W 72/08; H04W 72/085; H04Q 11/0471; H04M 3/005
See application file for complete search history.

(56) References Cited

U.S. PATENT DOCUMENTS

| | | | |
|---|---|---|---|
| 9,258,101 B2* | 2/2016 | Sun | H04L 5/0046 |
| 9,419,858 B2 | 8/2016 | Ling et al. | |
| 9,660,774 B2* | 5/2017 | Jin | H04L 27/3405 |
| 9,918,326 B2 | 3/2018 | Gilson et al. | |
| 10,560,759 B1* | 2/2020 | Liu | H04N 21/6587 |
| 10,608,897 B2* | 3/2020 | Schnitzer | H04L 41/5038 |
| 10,798,455 B2* | 10/2020 | Gilson | G06T 15/20 |
| 2010/0260254 A1* | 10/2010 | Kimmich | H04N 21/631 |
| | | | 375/240.01 |
| 2012/0230438 A1* | 9/2012 | Shrum, Jr. | H04N 19/30 |
| | | | 375/240.26 |
| 2014/0133330 A1 | 5/2014 | Chapman | |
| 2015/0188668 A1 | 7/2015 | Al-Banna | |
| 2015/0295684 A1 | 10/2015 | Jin et al. | |
| 2016/0226739 A1 | 8/2016 | Hamzeh et al. | |
| 2016/0353456 A1 | 12/2016 | Gilson et al. | |

\* cited by examiner

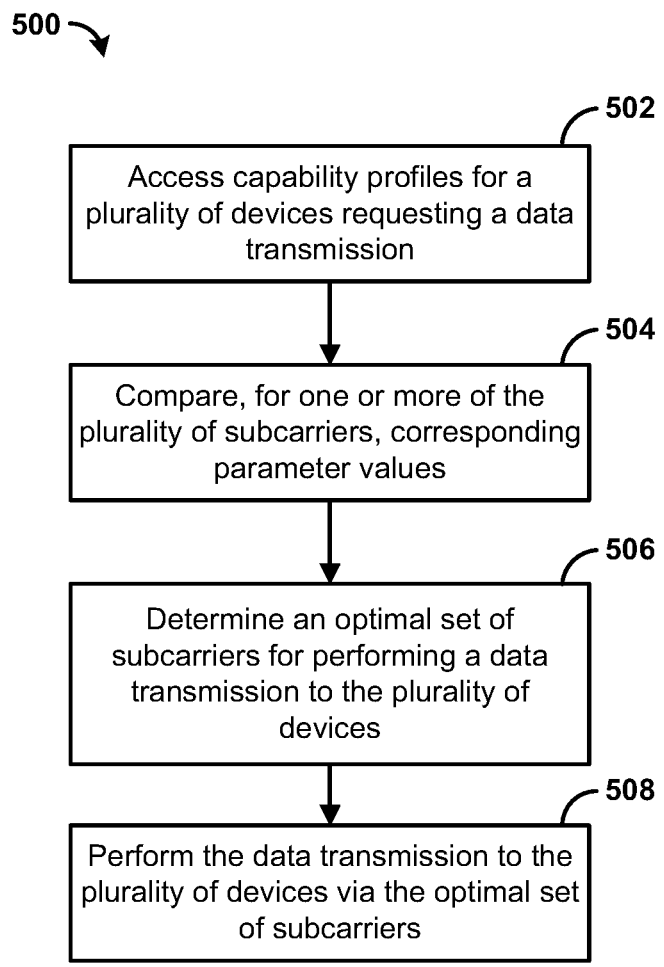

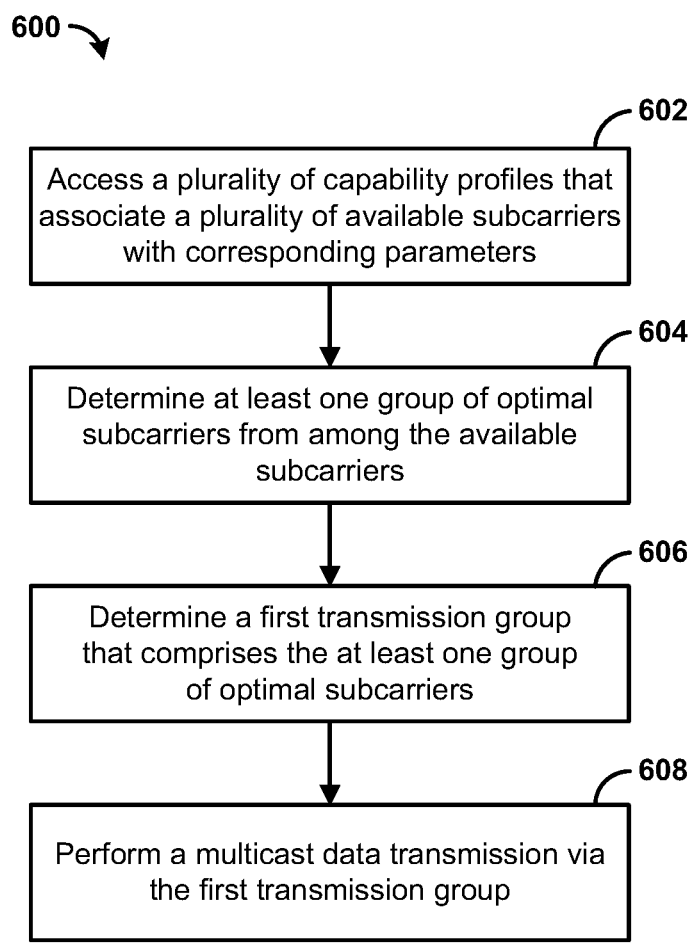

OPTIMIZING RESOURCES IN DATA TRANSMISSION

CROSS REFERENCE TO RELATED PATENT APPLICATION

This application is a continuation of U.S. patent application Ser. No. 15/886,654, filed Feb. 1, 2018, which is a continuation of U.S. patent application Ser. No. 14/722,981, filed May 27, 2015, issued as U.S. Pat. No. 9,918,326, both of which are herein incorporated by reference in their entirety.

BACKGROUND

A content provider often receives requests for the same data from multiple devices. Transmitting the requested data to the devices can be complicated by varying network conditions and different device capabilities. Thus, to transmit the data to all the devices, the content provider may be constrained to sacrifice quality and capacity to cater data transmission to the device with the lowest quality connection or capacity. Thus, there is therefore a need for more sophisticated methods and systems for transmitting data to optimize network and device resources.

SUMMARY

It is to be understood that both the following general description and the following detailed description are exemplary and explanatory only and are not restrictive. Methods and systems for performing (e.g., transmitting, providing) data are disclosed. A plurality of capability profiles for a communication system can be managed, stored, accessed, and/or the like. The capability profiles can specify parameters, such as modulation levels, of available subcarriers. The capability profiles can be generated dynamically or can be predefined. The capability profiles can describe, associate, and/or define capabilities of corresponding devices in communication with a data provider (e.g., based on network conditions, settings, or device capabilities). In an aspect, the disclosed methods and systems can leverage these capability profiles to identify an optimal set of subcarriers for providing a data transmission. The parameters (e.g., parameter values) of the available subcarriers can be compared, for example, to determine similarity or difference among values of the parameters. The similarity or difference can indicate, or otherwise be equivalent to, potential capacity loss and/or capacity reduction among the plurality of devices. An optimal set of subcarriers can be selected to minimize capacity loss and/or capacity reduction. The optimal set of subcarriers can comprise the subcarriers whose associated parameters have the greatest similarity (e.g., or lowest difference) among the capacity profiles. The data transmission, which may be a multicast data transmission, can be transmitted to the plurality of devices via the optimal set of subcarriers.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a flowchart illustrating another example method; and

FIG. 6 is a flowchart illustrating yet another example method.

DETAILED DESCRIPTION

Figure 1:
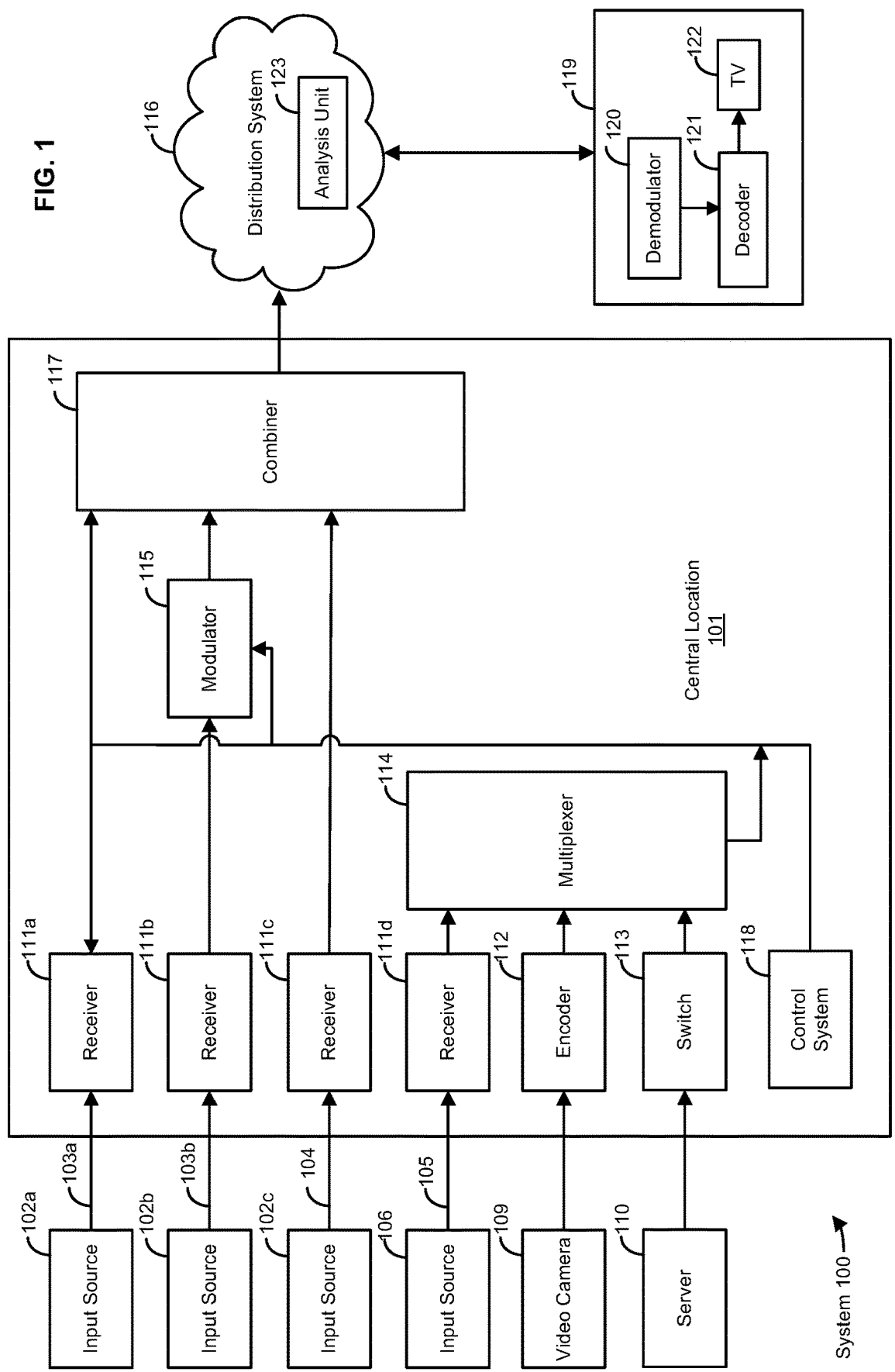
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In one aspect, the present methods and systems are related to efficiently providing (e.g., multicasting) a data transmission (e.g., video content) to a plurality of devices across a network. For example, when a plurality of devices subscribe to a multicast data transmission that is transmitted via a plurality of subcarriers, the plurality of devices can have different capabilities for processing signals and/or data transmitted via the plurality of subcarriers (e.g., demodulating capability, decoding capability). The disclosed methods and systems can select an optimal set of subcarriers from a plurality of available subcarriers signals to transmit (e.g., multicast) a data transmission (e.g., video content) to the plurality of devices based on the various processing capabilities of the plurality of devices to process each of the plurality of subcarriers. Using the selected optimal set of subcarriers to transmit the data transmission can enable the plurality of devices to consume the data transmission with minimal waste of resources (e.g., network resources, processing resources, energy resources).

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including a wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items. A content item can comprise one or more images, video, audio, combinations thereof, and the like.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or more modulators 115 for interfacing to a distribution system 116. The one or more modulators 115 can convert the received content into a modulated output signal suitable for transmission over the distribution system 116. For example, the one or more modulators 115 can be configured to use analog and/or digital modulation, such as amplitude modulation, phase shift keying, orthogonal frequency division multiplexing, and/or the like. In an aspect, the one or more modulators 115 can be configured to use modulation of a variety of complexities, transmission capacities, and/or the like. For example, the varying levels of complexity and/or transmission capacity can be denoted as modulation levels. For example, a modulator 115 configured to use quadrature amplitude modulation (QAM) can be configured to provide signals using the following modulation levels: QAM 16K modulation, QAM 4096 modulation, QAM 1024 modulation, QAM 256 modulation, QAM 64 modulation, QAM 16 modulation, and/or the like. The output signals from the modulators can be combined, using equipment such as a combiner 117, for input into the distribution system 116.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The distribution system 116 can distribute signals from the central location 101 to user locations, such as a user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to the distribution system 116. At the user location 119, a demodulator 120, a decoder 121, such as a gateway or home communications terminal (HCT) can decode, if needed, the signals for display on a display device, such as on a television set (TV) 122 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more of the decoder 121, the TV 122, the central location 101, DVRs, home theater PCs, and the like.

In an aspect, the distribution system 116 can comprise an analysis unit 123 configured to perform analysis related to providing data to one or more devices at one or more user locations 119. For example, the analysis unit 123 can be configured to determine capability information of one or more (or each) devices of a group of devices requesting the same or similar data. The analysis unit 123 can be configured to use the capability information to determine parameters for providing the data to the group of devices. The parameters can comprise modulation parameters (e.g., modulation level, subcarriers to transmit the data), transmission parameters (e.g., multicast group, unicast transmissions, scalable video coding parameters), encoding parameters (e.g., bit rate), and/or the like. For example, the analysis unit 123 can be configured to assist the distribution system 116, a device (e.g., modulator 115) at the central location 101, and/or the like in selecting subcarriers for a data transmission to one or more user locations.

In an aspect, the distribution system 116 can transmit data via a plurality of subcarriers. As an example, the modulator 115 can be configured to transmit data as sequence of data symbols according to symbol rate. A data symbol can comprise a waveform that persists for a given period of time. The symbol rate can define the number of symbols provided to a network link of the distribution system 116 by the modulator 115 during a time period. Each data symbol can be transmitted via a plurality of subcarriers. For example, each of the subcarriers can correspond to a particular frequency and/or frequency range on which a corresponding signal (e.g., waveform) is provided. For example, each of the corresponding signals can carry data based on corresponding amplitudes, in-phase values, quadrature values, and/or the like that define the signals. The in-phase value can define a sinusoidal wave component that is shifted in phase (e.g., 90 degrees) from a sinusoidal wave component defined by the quadrature value. In an aspect, the subcarriers can be orthogonal frequency division multiplexing (OFDM) subcarriers or other similar subcarriers.

In an aspect, one or more subcarriers signals can be selected for a transmission, such as a multicast transmission, based on analysis performed by the analysis unit 123. Additionally, the analysis unit 123 can be configured to provide parameters to the modulator 115 and/or the encoder 112. As explained further herein, encoding parameters, modulation parameters, and/or the like can be selected and provided to the encoder 112 and/or the modulator 115 to enable selection of particular subcarriers for transmission of a data signal. For example, the analysis unit 123 can comprise a capability analysis unit 306 and/or a signal selection unit 308 of FIG. 3.

In an aspect, the distribution system 116 can multicast, broadcast, and/or unicast data signals. The data signals can be performed (e.g., transmitted, sent, provided) via carrier aggregations by sending data signals via multiple channels, bands, subcarrier groups, and/or the like. For example, data signals can be transmitted via over-the-air broadcast, large scale 4G, wireless local area network (WLAN), wired local area network (LAN), metropolitan area network (MAN), long-term evolution (LTE), and/or the like.

In an aspect, the methods and systems disclosed can be located within equipment located at the user location 119, other user locations, and/or the distribution system 116. For example, data can be provided across a network (e.g., distribution system 116) as a plurality of signals to the user location 119 or other user locations. As a further explanation, the methods and systems can be implemented via the analysis unit 123, the encoder 112, the modulator 115, and/or the like.

Figure 2:
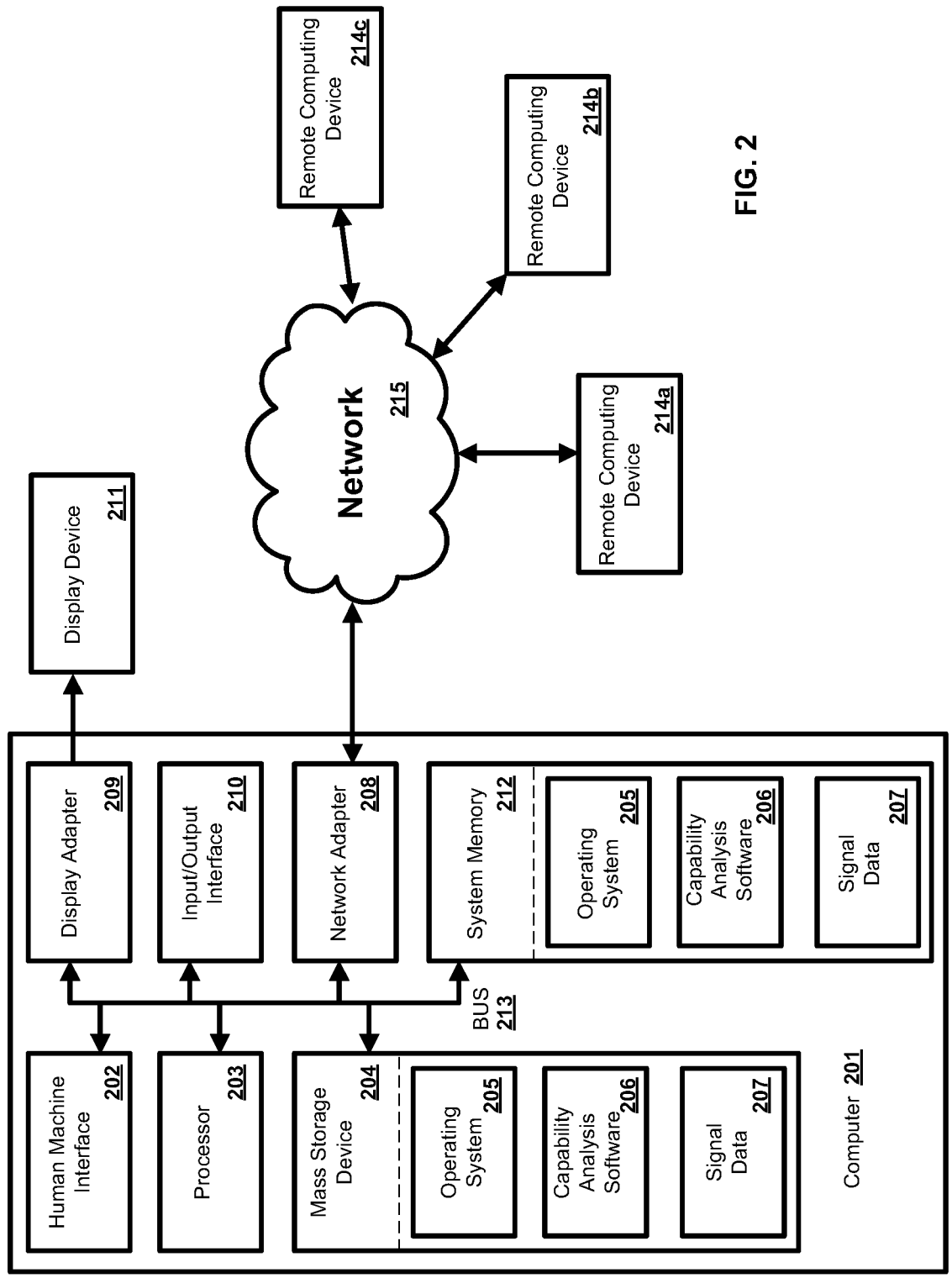
FIG. 2 is a block diagram illustrating an example computing system in which the present methods and systems can operate.

In an exemplary aspect, the methods and systems can be implemented on a computer 201 as illustrated in FIG. 2 and described below. By way of example, the server 110 of FIG. 1 and/or the analysis unit 123 of FIG. 1 can be a computer as illustrated in FIG. 2. The first device 302, second device 312, third device 314, fourth device 316, fifth device 318, and/or sixth device 320 of FIG. 3 can be computers as illustrated in FIG. 2. Similarly, the methods and systems disclosed can utilize one or more computers to perform one or more functions in one or more locations.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices.

Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors 203, a system memory 212, and a system bus 213 that couples various system components including the one or more processors 203 to the system memory 212. In an aspect, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 213, and all buses specified in this description can also be implemented over a wired or wireless network connection and each of the subsystems, including the one or more processors 203, a mass storage device 204, an operating system 205, capability analysis software 206, signal data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as signal data 207 and/or program modules such as operating system 205 and capability analysis software 206 that are immediately accessible to and/or are presently operated on by the one or more processors 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and capability analysis software 206. Each of the operating system 205 and capability analysis software 206 (or some combination thereof) can comprise elements of the programming and the capability analysis software 206. Signal data 207 can also be stored on the mass storage device 204. Signal data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display device 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computer 201, and are executed by the one or more processors 203. An implementation of capability analysis software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 3:
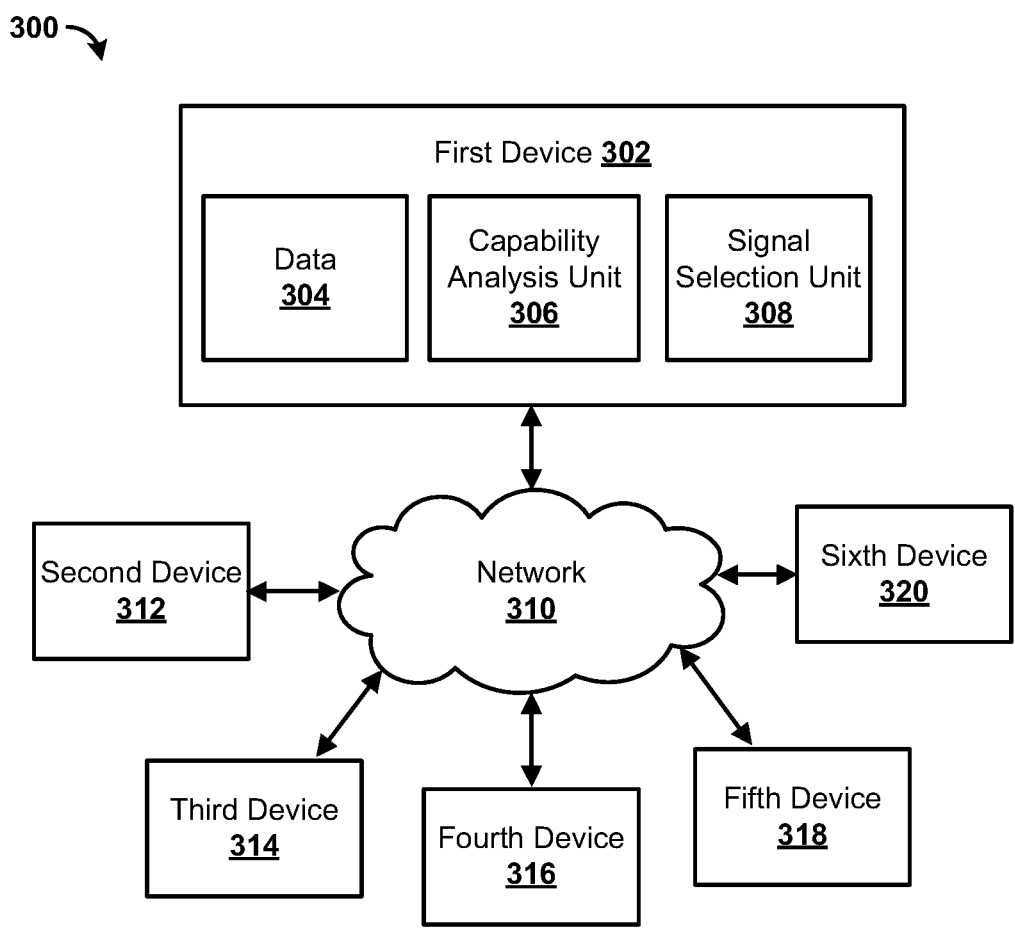
FIG. 3 is a block diagram illustrating an example system.

FIG. 3 is a block diagram illustrating an example system 300 for providing data. In an aspect, the system 100 can comprise a first device 302. In an aspect, the first device 302 can be configured to store, access, process, transmit, and/or the like data 304. The first device 302 can be a server for communicating with a plurality of devices, such as a second device 312, a third device 314, a fourth device 316, a fifth device 318, and a sixth device 320. In one aspect, the first device 302 can comprise a variety of devices configured to process the data 304. For example, the first device 302 can comprise a data server, encoder, modulator, and/or the like. As another example, the first device 302 can comprise an access platform (e.g., converged cable access platform) configured to provide the data 304 across a variety of networks in a variety of formats.

As an example, the first device 302 can communicate with the plurality of devices for providing content and/or services. As an example, data can comprise video, audio, metadata, text, program guide information, application data, and/or the like. The data 304 can be organized as one or more data transmissions, such as content channels, video on demand, digital video recordings, and the like. As an example, the first device 302 can provide services such as network (e.g., Internet) connectivity, network printing, media management (e.g., media server), content services, streaming services, broadband services, or other network-related services. In an aspect, the first device 302 can allow the plurality of devices to interact with remote resources such as data, devices, and files. As an example, the first device 302 can be configured as (or disposed at) a central location (e.g., a headend, or processing facility) or edge location, which can receive content (e.g., data, input programming) from one or more sources. The first device 302 can combine the content from the one or more sources and can distribute the content to user (e.g., subscriber) locations via a network 310.

In an aspect, the network 310 can comprise a packet switched network (e.g., internet protocol based network), a non-packet switched network (e.g., quadrature amplitude modulation based network), and/or the like. The network 310 can comprise network adapters, switches, routers, modems, and the like connected through wireless links (e.g., radio frequency, satellite) and/or physical links (e.g., fiber optic cable, coaxial cable, Ethernet cable, or a combination thereof). The network 310 can comprise public networks, private networks, wide area networks (e.g., Internet), local area networks, and/or the like. The network 310 can comprise a content access network, a content distribution network, and/or the like. In one aspect, the network 310 can be configured to provide communication from telephone, cellular, modem, and/or other electronic devices to and throughout the system 300. For example, the network 310 can be configured to communicatively couple one or more of a first device 302, second device 312, third device 314, fourth device 316, fifth device 318, sixth device 320 and/or the like.

In an aspect, one or more of the plurality of devices (e.g., the second device 312, the third device 314, the fourth device 316, fifth device 318, and the sixth device 320) can be user devices. The plurality of devices can be configured to perform (e.g., transmit, provide) content, services, information, applications, and/or the like to one or more users. For example, each of the plurality of devices can comprise a computer, a smart device (e.g., a smart phone, smart watch, smart glasses, smart apparel, smart accessory), a laptop, a tablet, a set top box, a display device (e.g., television, monitor), a digital streaming device, a proxy, a gateway, a transportation device (e.g., an on-board computer, a navigation system, a vehicle media center), a sensor node, and/or the like.

In an aspect, the first device 302 can be configured to transmit the data 304 via one or more data transmissions. An example data transmission can comprise, for example, a data stream, file transfer, and/or the like. In an aspect, the data transmission (e.g., data 304) can be modulated according to one or more complexity levels (e.g., QAM 16K, QAM 4096, QAM 1024, QAM 256, QAM 64, QAM 16, QPSK, BPSK). The one or more data transmissions can comprise a unicast transmission, a broadcast transmission, a multicast transmission, and/or the like. The data 304 can be transmitted across the network 310 in the form of a plurality of subcarriers. The first device 302 can be configured to divide, segment, and/or the like a first portion of the data, such as a content item (e.g., show, movie, episode, newscast, sportscast) into multiple transmissions. The first device 302 can transmit the multiple transmissions to one or more of the plurality of devices via the network 310. In one aspect, the multiple transmissions can be generated based on scalable video encoding (SVC) or similar technique. For example, when generated using SVC, the multiple transmissions can be combined together to form a single data stream, file, and/or the like.

In another aspect, the first device 302 can generate the multiple data transmissions via carrier aggregation techniques. A first portion of the multiple data transmissions can be transmitted via a first set of subcarriers, a first band, a first channel, and/or the like. A second portion of the multiple data transmissions can be transmitted via a second set of subcarriers, a second band, a second channel, and/or the like. For example, the plurality of devices can receive and combine the first portion of the multiple data transmissions and the second portion of the multiple data transmissions. As an example, multiple contiguous and/or non-contiguous frequency bands (e.g., on a physical line and/or wireless link of the network 310) can be selected and utilized for transmission of the multiple data transmissions.

5234 group norms and first device 302 can comprise a capability analysis unit 306 configured to determine capabilities of one or more devices requesting the data 304, such as the plurality of devices (e.g., second device 312, third device 314, fourth device 316, fifth device 318, and sixth device 320). For example, the capability analysis unit 306 can receive and/or process capability information associated with the plurality of devices. For example, the capability information can comprise demodulation capability information (e.g., modulation levels a device can demodulate or modulate), error correction capability information, deinterleaving information, modulation error ratio (MER), signal-to-noise ratio (SNR), error vector magnitude (EVM), and/or the like. In an aspect, the capability information can be a plurality of values. The capability information can be determined based on probe measurements, predefined configurations, signaling history, test signals, information received from the plurality of devices, and/or the like.

The capability information can be determined based on one or more capability profiles. For example, the first device 302 can manage (e.g., generate, access, modify) the one or more capability profiles dynamically (e.g., as devices and conditions change) or use predefined capability profiles. For example, each of the plurality of devices can be associated with a corresponding capability profile. In some scenarios, more than one of the plurality of devices can be associated with the same capability profile. The analysis unit 123 can be configured to receive and/or determine one or more capability profiles associated with the plurality of devices. The capability profiles can indicate the corresponding devices' capabilities, configuration, and/or the like for processing signals. In an aspect, processing signals can comprise demodulating, modulating, decoding, encoding, correcting, de-interleaving, transmitting and/or the like of signals by the devices.

A capability profile can comprise a plurality of subcarriers assigned to corresponding modulation levels. In one aspect, a capability profile can assign groups of the plurality of subcarriers for specified purposes, such as multicast transmissions. As an example, if there are 8 modulation levels and 500 available subcarriers signals, a portion of the 500 subcarriers (e.g., 50 of the subcarriers) can be assigned as multicast subcarriers. The assigned multicast subcarriers can all be assigned to the same modulation level (e.g., or group of modulation levels).

In an aspect, a capability profile can be static or dynamic. For example, for in networks where assignment and modulation levels of one or more subcarriers can be dynamic, capability profiles can also be dynamic. For example, as network conditions change, the capability profiles for the devices can be updated, thereby changing modulation levels for one or more subcarriers. In the case of static capability profiles, one or more capability profiles can be predefined for a particular device, system, and/or the like. The first device 302 can be configured to assign various capability profiles to the corresponding devices of the plurality of devices.

As an example, the one or more capability profiles can comprise a first capability profile. The first capability profile can be a low capability profile (e.g., emergency profile) configured to allow basic communication (e.g., which may be impractical for transmitting higher bit rate multimedia). The first capability profile can be used for problem reporting, emergency communication, and/or the like. The one or more capability profiles can comprise a second capability profile. The second capability profile can configure devices to communicate using maximum or near maximum bit loading (e.g., highest modulation level supported by the network 310) across a plurality of subcarriers to support the highest data rate (e.g., and best signal) supported by the system 300. The one or more capability profiles can comprise additional capability profiles associated with various modulation levels (e.g., levels of bit loading), such as modulation levels in between the modulation levels of the first capability profile and the second capability profile. As an example, in a data over cable service interface specification (DOCSIS) based system (e.g., DOCSIS 3.1), the first device 302 can be configured to assign four (e.g., or three, five, or other appropriate number) different predefined capability profiles among the plurality of devices.

In general, the first device 302 can assign capability profiles to the plurality of devices based on connection information determined by the first device 302. Connection information can comprise signal-to-noise ratio (e.g., for signals between the first device 302 and a corresponding device), noise levels, device capability (e.g., memory, processor speed, software and/or hardware configuration), network path distance, network hops, and/or the like. For example, devices of the plurality of devices that have greater signal-to-noise ratios, lower noise levels, greater device capabilities, and the like, can be assigned a capability profile with higher modulation levels, such as the second capability profile. While devices of the plurality of devices that have lower signal-to-noise ratios, higher noise levels, lower device capabilities, greater network path distance, and the like, can be assigned a capability profile with lower modulation levels than the second capability profile.

In an aspect, the capability analysis unit 306 can be configured to map the received capability information to a plurality of values. For example, the plurality of values can be a plurality of integers (e.g., 0, 1, 2, 3, 4, 5, 6, 7, 8, etc.). In an aspect, the values (e.g., integers) to be assigned can be indicative of capability levels the plurality of devices. In an aspect, a mapping scheme can be utilized to map (e.g., associate) the capability information of devices to specific values. For example, a capability of demodulating a signal at the highest modulation level (e.g., QAM 16K modulated signal) can be associated with a largest value (e.g., 8) of the mapping scheme, a capability of demodulating a signal at second highest modulation level (e.g., QAM 4096 modulated signal) can be associated with a second largest value (e.g., 7), a capability of demodulating a signal at a third highest modulation level (e.g., a QAM 1024 modulated signal) can be associated with a third largest value (e.g., 6), a capability of demodulating a signal at a fourth highest modulation level (e.g., a QAM 256 modulated signal) can be associated with a fourth largest value (e.g., 5), a capability of demodulating a signal at fifth highest modulation level (e.g., a QAM 64 modulated signal) can be associated with a fifth largest value (e.g., 4), a capability of demodulating a signal at a sixth highest modulation level (e.g., a QAM 16 modulated signal) can be associated with a sixth largest value (e.g., 3), a capability of demodulating a signal at a seventh highest modulation level (e.g., a quadrature phase shift keying modulated signal) can be associated with a seventh largest value (e.g., 2), a capability of demodulating a signal at an eighth highest modulation level (e.g., a binary phase-shift keying modulated signal) can be associated with a eighth largest value (e.g., 1), and the inability to demodulate a signal can be associated with a lowest value (e.g., 0).

Throughout the disclosure, an example mapping scheme of 0-8 is used for illustration purposes, but it should be understood that different mapping schemes can be used for characterizing capability information. Additionally, QAM is given as an example throughout the disclosure for illustration purposes, but the system can use other modulation techniques for any bit loading application, such as binary phase shift keying (BPSK), frequency-shift keying (FSK), phase-shift keying (PSK), Gaussian minimum shift keying (GSMK), orthogonal frequency division multiplexing (OFDM), and/or the like.

In an aspect, the first device 302 can comprise a signal selection unit 308 configured to determine signal parameters for performing (e.g., transmitting, providing) one or more data transmissions. For example, one or more of the plurality of devices can request transmission for the first portion of the data, such as the content item. The signal selection unit 308 can select one or more subcarriers for transmission of the first portion of the data based on the capability information related to the requesting devices. The signal selection unit 308 can be configured to select an optimal set of subcarriers for transmission of the first portion of the content based on the capability information.

In an aspect, the optimal set of subcarriers can be selected by comparing or otherwise analyzing the capability information of one or more (or each) of the devices requesting the first portion of the content. The optimal set of subcarriers can be determined based on a capacity reduction metric. The capacity reduction metric can comprise a measure of the amount of capacity lost among one or more of the requesting devices if a particular subcarrier or set of subcarriers is used for transmission of the first portion of the data. For example, the second device 312 can be configured to use the seventh modulation level for a particular subcarrier, while the third device 314 can be configured to use the second modulation level for the particular subcarrier. To send the first portion of the content, via a multicast transmission on the particular subcarrier, to both the second device 312 and third device 314, the first device 302 may be constrained to use the lower modulation level (e.g., second modulation level). Transmitting to both the second device 312 and third device 314 at the lower modulation level may result in a reduction or loss of the full capacity of the second device 312 to receive at the higher modulation (e.g., seventh modulation level) on the particular subcarrier.

As an example, the system 300 can comprise 100 devices and 10 subcarriers available for data transmission. In a first scenario, 99 devices support a maximum of QAM 16 across all subcarriers, and one device supports QAM 64 across all subcarriers. QAM 16 can be used as multicast subcarriers to the 100 devices. In a second scenario, 99 devices support a maximum of QAM 64 across all subcarriers, and one device supports only QAM 16 across all subcarriers. QAM 16 can be used as multicast to the 100 devices. In the second scenario, performances of 99 devices are downgraded, whereas performance of only 1 device is downgraded in the first scenario. The bandwidth lost is much greater in the second scenario. Therefore, the number of bits lost per subcarrier is much greater in the second scenario.

In an aspect, the capacity reduction metric can be calculated according to the following algorithm:

```
For (each subcarrier){
    <capacity reduction in bits> = 0;
    For(device){
        <capacity reduction in bits> += <modulation this device
        supports
    in bits> – <maximum multicast modulation level in bits>;
    }
    [store the number of bits of capacity lost for this subcarrier]
}
```

The above algorithm illustrates that the capacity reduction metric can be calculated separately for each subcarrier. The capacity reduction metric initially begins at zero. Then, for each device requesting the first portion of the data (e.g., requesting to join a multicast transmission of the first portion of the data), a capacity reduction value is determined by subtracting the maximum multicast modulation level from the modulation level the device supports. The maximum multicast modulation level can be the highest modulation level supported by all the devices. The capacity reduction value for each of the requesting devices is summed to determine the capacity reduction metric. Then, the capacity reduction metric can be stored.

In an aspect, the optimal set of subcarriers can comprise the set of subcarriers that minimizes the capacity reduction metric. For example, the available subcarriers can be ranked, prioritized, and/or the like based on the capacity reduction metric corresponding to the subcarrier. The optimal set of subcarriers can comprise the subcarriers with the highest ranking (e.g., with the lowest capacity reduction metric).

In another aspect, the optimal set of subcarriers can be based on bandwidth parameters (e.g., constraints). For example, the first portion of the data can comprise a bit rate, resolution, and/or the like, which can define and/or constrain the bandwidth parameters. For example, the optimal set of subcarriers can be selected if the selected subcarriers are associated with high enough modulation levels to meet the requirements for maintaining the bit rate, resolution, and/or the like.

In another aspect, the signal selection unit 308 can be configured to determine the capacity reduction metric by comparing one or more minimum capability to one or more corresponding maximum capability. For example, each of the minimum capability and maximum capability can be for a particular subcarrier. The signal selection unit 308 can be configured to determine the capability associated with a subcarrier for each of the devices requesting the first portion of the data. The signal selection unit 308 can identify the lowest capacity of the requesting devices as the minimum capability for the subcarrier. The signal selection unit 308 can identify the highest capacity of the requesting devices as the maximum capability for the subcarrier. The maximum capability and the minimum capability can be determined for one or more (or each) of the available subcarriers. For each subcarrier, the minimum capability can be subtracted from the maximum capability, thereby determining a capacity reduction value for the corresponding subcarrier.

The signal selection unit 308 can be configured to calculate a difference between a value corresponding to a maximum capability and a value corresponding to a minimum capability. As such, the difference in value can be mathematically related to and/or indicative of a difference in capability. In an aspect, the difference in value below a predefined threshold (e.g., 1) can indicate a similar capability. As a further example, the signal selection unit 308 can be configured to use one or more predefined mathematical equations to evaluate to a difference in value. In an aspect, the difference in value can translate to the amount of data loss (e.g., amount of bit loss per subcarrier). Accordingly, the subcarriers can be prioritized, ranked, and/or the like accordingly to the differences in value between the maximum capability and minimum capability. The highest ranked and/or prioritized subcarriers can be selected as part of the optimal set of subcarriers. As another example, the subcarriers can be selected as part of the optimal set of subcarriers if the difference in value between the maximum capability and minimum capability is at or below the predefined threshold. The signal selection unit 308 can be configured to select one or more of the subcarriers to transmit (e.g., multicast) the first portion of the data to the plurality of devices based on the determined minimum capability and the maximum capability. For example, the optimal set of subcarriers can be used to transmit the first portion of the data to the plurality of devices.

As an example, the plurality of devices (e.g., second device 312, third device 314, fourth device 316, fifth device 318, and sixth device 320) can subscribe, request, and/or otherwise receive a data transmission of the first portion of the data. The data transmission can be a multicast transmission. For the purposes of illustration, it is assumed that the data transmission can be transmitted via five subcarriers. The second device 312 can have a capability profile as follows: QAM 16 demodulation on a first subcarrier, QAM 64 demodulation on a second subcarrier, QAM 16 demodulation on a third subcarrier, QAM 64 demodulation on a fourth subcarrier, QAM 64 demodulation on a fifth subcarrier. The capability profile for the second device 312 can be represented as 34344, where each number refers to a modulation level. Similarly, capability profiles for a third device 314, a fourth device 316, a fifth device 318, and a sixth device 320, can be expressed as 44365, 64425, 54364, and 04424, respectively. It should be noted that, in this scenario, the zero in the capability profile of the sixth device 320 indicates that the sixth device 320 is not capable of processing (e.g., demodulating) the first subcarrier.

Therefore, in this scenario, a maximum capability to perform demodulation on the first subcarrier is the maximum value of 3, 4, 6, 5, and 0, which is 6. A maximum capability to perform demodulation on the second subcarrier is the maximum value of 4, 4, 4, 4, and 4, which is 4. A maximum capability to perform demodulation on the third subcarrier is the maximum value of 3, 3, 4, 3, and 4, which is 4. A maximum capability to perform demodulation on the fourth subcarrier is the maximum value of 4, 6, 2, 6, and 2, which is 6. A maximum capability to perform demodulation on the fifth subcarrier is the maximum value among 4, 5, 5, 4, and 4, which is 5. As such, a maximum capability to perform demodulation on each of the five subcarriers can be 64465 among the five devices. Similarly, a minimum capability to perform demodulation on each of the five subcarriers can be represented as 04324 among the five devices. The difference between the maximum capability and the minimum capability for the five subcarriers can be represented as X0141, where "X" indicates that at least one device can not process the corresponding signal (e.g., first subcarrier). When the difference between the maximum capability and the minimum capability is X0141, the five devices have a similar capability to process the second subcarrier, the third subcarrier, and the fifth subcarrier. The differences between the maximum capability and the minimum capability to process the second signal, the third signal and the fifth signal are 0, 1, and 1, respectively. Therefore, the second signal, the third subcarrier and the fifth subcarrier can be candidate subcarriers to be used for transmitting the first portion of the data to the plurality of devices.

In an aspect, the signal selection unit 308 can be configured to select subcarriers in the context of multiple bit rate transmission. For example, the first portion of the data can be performed (e.g., transmitted, provided) as a plurality of data transmissions at different bit rates. Since the bit rates are defined, the signal selection unit 308 can determine the number of subcarriers for a data transmission based on the bit rate of the data transmission. For example, subcarriers with lower modulation levels can be prioritized for selection as part of the optimal set of subcarriers for data streams with lower bit rates. Depending on device capabilities, network conditions, and/or other factors, different devices of the plurality of devices can request data transmissions of the first portion of the data at different bit rates. For one or more of the data transmission at different bit rates, the signal selection unit 308 can apply the techniques disclosed herein to determine an optimal set of subcarriers for the particular data transmission at the particular bit rate. The optimal set of subcarriers can be determined based on the device capabilities associated with the devices requesting the particular data transmission at the particular bit rate. As network or other conditions change, one or more of the requesting devices may switch to different data transmissions (e.g., of the first portion of the data) at bit rates different than the bit rates of the prior requested data transmission (e.g., of the first portion of the data). In response, the signal selection unit 308 can be configured to update the optimal set of subcarriers in response to the changes in the capability information of the devices requesting a particular data transmission.

In another aspect, the signal selection unit 308 can be configured to select subcarriers in the context of multiple bit rate transmission with scalable video coding. In the context of the scalable video coding, each of the devices requesting a data transmission at a particular bit rate must also request all of the data transmission at lower bit rates. Thus, the lowest bit rate data transmission (e.g., of the first portion of the data) will often have a larger number of devices requesting the data transmission than the number of devices requesting data transmissions (e.g., of the first portion of the data) at higher bit rates. The signal selection unit 308 can be configured to prioritize selection of the optimal set of subcarriers for the data transmissions at lower bit rates over the selection of optimal sets of subcarriers for higher data transmissions at higher bit rates. For example, a first data transmission at a first rate (e.g., lowest offered bit rate) can have a first optimal set of subcarriers. The second data transmission can subsequently have a second optimal set of subcarriers selected. The first optimal set of subcarriers can be different than the second set of optimal subcarriers because each of subcarriers may only be configured to be used in transmitting a single data transmission. As the first optimal set of subcarriers are selected before the second set of optimal subcarriers, the first optimal set of subcarriers may provide less capacity reduction than the capacity reduction of the second set of optimal subcarriers.

In one aspect, the signal selection unit 308 can be configured to identity circumstances in which it is desirable to modify one or more parameters, such as a bit rate of a particular data transmission. The signal selection unit 308 can be configured to determine that a lower capacity reduction is achievable if one or more of the parameters is modified. In such scenarios, the signal selection unit 308 can be configured to send an instruction (e.g., in real time) to an encoder (e.g., encoder 112), modulator (e.g., modulator 115), packager, and/or the like (e.g., of the first device 302) to set, modify, update, and/or the like the one or more parameters of the data transmission to allow for selection of an optimal set of subcarriers associated with the lower capacity reduction.

In an aspect, the signal selection unit 308 can be configured to determine an optimal set of subcarriers in the context of carrier aggregation. For example, the first device 302 can be configured to provide data transmissions in multiple channels, bands, and/or defined groups of subcarriers. Each channel, band, and/or subcarrier grouping can comprise a corresponding set of subcarriers available for transmission within the channel, band, and/or subcarrier grouping. As an example, the signal selection unit 308 can be configured to determine a first optimal set of subcarriers for a first channel, band, and/or grouping and a second optimal set of subcarriers for a second channel, band, and/or grouping. The signal selection unit 308 can be configured to compare the capacity reduction information (e.g., capacity reduction values and metrics) of the first optimal set of subcarriers to the capacity reduction information for the second optimal set of subcarriers. The signal selection unit 308 can be configured to select the optimal set of subcarriers having the lower capacity reduction among the first optimal set of subcarriers and second set of optimal subcarriers. As another example, the signal selection unit 308 can be configured to divide the data transmission into multiple data transmissions corresponding to different channels, bands, and/or subcarrier groupings. The signal selection unit 308 can select the optimal set of subcarriers in each of the channels, bands, and/or subcarriers and provide corresponding portions of the divided data transmission via the corresponding channels, bands, and/or subcarrier groupings.

Figure 4:
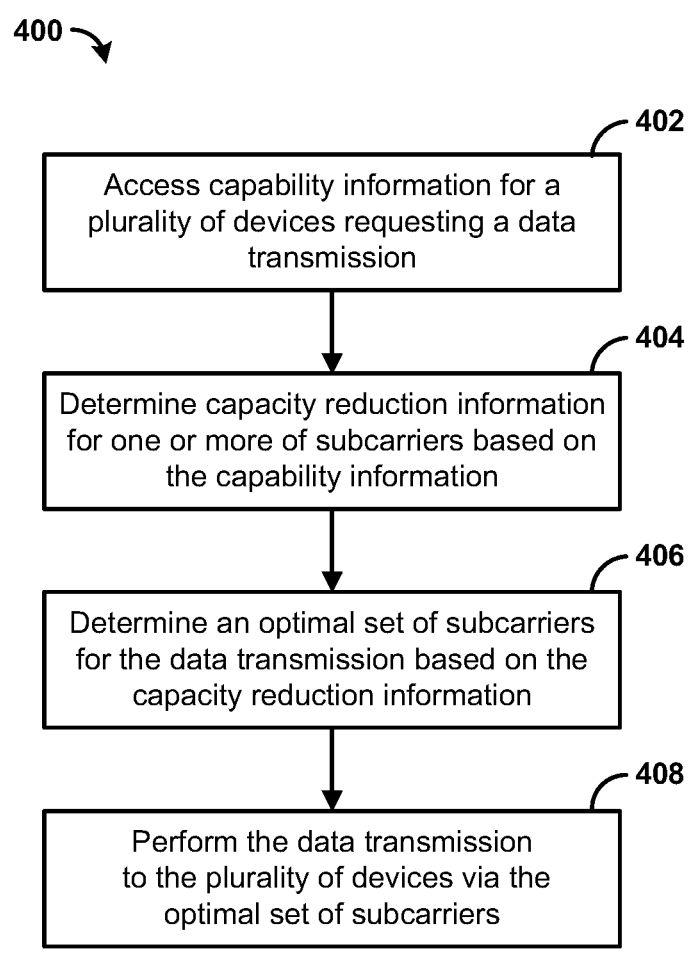
FIG. 4 is a flowchart illustrating an example method.

FIG. 4 is a flowchart illustrating an example method 400 for performing (e.g., transmitting, providing) data. At step 402, capability information for a plurality of devices requesting (e.g., or that requested) a data transmission can be accessed. For example, the capability information can be accessed from a local data store. As another example, the capability information can be requested, received, and/or accessed from each of the plurality of devices. The capability information can specify (e.g., indicate) capabilities (of the plurality of devices) associated with corresponding subcarriers. The capability information can indicate capabilities of the plurality of devices for the subcarriers. The capability information can be specific to each of the plurality of devices (e.g., though some devices may have identical or similar capabilities). The capability information can specify (e.g., indicate) a corresponding parameter (e.g., indicative of device setting or capability) and/or parameter value for each of the one or more subcarriers. The parameter and/or parameter value can relate to demodulating the data transmission, decoding the data transmission, error correction of the data transmission, and deinterleaving the data transmission. For example, the capability information can specify a modulation level (e.g., QAM 16, QAM 64, QAM 256, QAM 1024, QAM 4096, QAM 16K), modulation scheme, and/or the like for each subcarrier.

At step 404, capacity reduction information for one or more of the subcarriers can be determined based on the capability information. The capacity reduction information can comprise capacity loss among the plurality of devices to receive the data transmission via the one or more subcarriers according to a common parameter. The capacity reduction information can comprise a capacity loss for the plurality of devices if a common parameter value is used, for a respective subcarrier, to perform (e.g., transmit, provide) the data transmission to each of the plurality of devices via the respective subcarriers. The common parameter can comprise the parameter relating to demodulating the data transmission, decoding the data transmission, error correction of the data transmission, deinterleaving the data transmission, and/or the like. As a further example, the common parameter can comprise a modulation level (e.g., QAM 16, QAM 64, QAM 256, QAM 1024, QAM 4096, QAM 16K), modulation scheme, and/or the like.

In an aspect, determining the capacity reduction information can comprise determining a capacity loss, for each device, for each of the one or more subcarriers. The capacity reduction information can comprise an amount of bit capacity lost by a first portion of the plurality of devices due to a bit capacity limitation of a second portion of the plurality of devices. For example, the bit capacity limitation can comprise a first modulation level (e.g., lowest modulation level assigned to a respective subcarrier among the plurality of devices). The first portion of the plurality of devices can support modulation levels that are higher (e.g., higher complexity, higher bit rate) than the first modulation level. The common parameter can comprise the first modulation level. Accordingly, if the first portion of the plurality of devices receives the data transmission at the first modulation level, then the first portion of the plurality of devices will experience capacity loss because the first portion of the plurality of devices can perform (e.g., transmit, provide) the data transmission at higher modulation levels than the first modulation level. Thus, the capacity reduction information can be determined by subtracting the modulation level corresponding to each of the first portion of the plurality of devices from the first modulation level.

In another aspect, the capacity reduction information can be determined based on comparison of maximum capabilities and minimum capabilities for devices on corresponding subcarriers. For example, determining capacity reduction information for one or more of the subcarriers can comprise determining, for each device of the plurality of devices, a capability related to a first subcarrier of the one or more subcarriers. Additionally, a minimum capability for the first subcarrier and a maximum capability for the first subcarrier can be determined from the capabilities related to the first subcarrier. The minimum capability can be subtracted from the maximum capability. A capacity loss can be calculated, for the first subcarrier of the one or more subcarriers, by (e.g., as the result of) subtracting the minimum capability from the maximum capability.

At step 406, an optimal set of subcarriers for (e.g., to carry) the data transmission can be determined based on the capacity reduction information. For example, determining the optimal set of subcarriers for (e.g., to carry) the data transmission can comprise determining (e.g., selecting) subcarriers that minimize the capacity loss among the plurality of devices. As another example, the subcarriers can be ranked, prioritized, and/or the like based on the capacity reduction information (e.g., capacity loss) determined in step 404. The subcarriers with the highest ranking (e.g., and lowest capacity loss) can be determined (e.g., selected) as the optimal set of subcarriers. In an aspect, the optimal set of subcarriers can be determined (e.g., selected) based on the data rate of the data transmission. For example, each of the subcarriers can be configured to provide a certain amount of data. Accordingly, the optimal set of subcarriers can be determined (e.g., selected) such that data capacity of the subcarriers is not wasted. The optimal set of subcarriers can be determined (e.g., selected) such that the data capacity of the optimal set of subcarriers is enough for the data rate of the data transmission.

At step 408, the data transmission can be performed (e.g., transmitted, provided) to the plurality of devices via the optimal set of subcarriers. For example, the data transmission can be multicast, broadcast, unicast, and/or the like to the plurality of devices. In an aspect, the data transmission can comprise content, such as video, audio, text, and/or the like. The content can comprise and/or represent a live event (e.g., sports game, live show, newscast). The data transmission and/or the content can be requested by each of the plurality of devices. The plurality of devices can comprise computing devices, televisions, mobile devices (e.g., cell phones, tablets), smart devices, (e.g., smart glasses, smart apparel, smart watch), set top boxes, and/or the like as further described herein. The data transmission can be multicast to the plurality of devices via DOCSIS, OFDM based protocol, home plug, LTE carrier aggregation, MoCA, or a combination thereof.

In an aspect, the method 400 can further comprise adjusting an encoding parameter (e.g., encoding parameter value), modulation parameter (e.g., modulation parameter value), or a combination thereof to accommodate a limitation of the optimal set of subcarriers. The data transmission can be encoded based on the encoding parameter, modulated based on the modulation parameter, and/or a combination thereof before the performing (e.g., transmitting, providing) of the data transmission. The limitation can comprise a bit rate limitation. For example, the optimal set of subcarriers may be configured to perform (e.g., transmit, provide) data with a total bit rate which is less than the requested data transmission. An encoding instruction can be sent to an encoder (e.g., encoder 112) to decrease the bit rate of the data transmission to accommodate the total bit rate supported by the optimal set of subcarriers.

In an aspect, the method 400 can be applied in the context of carrier aggregation, such as a wireless communication system (e.g., cell phone communication system) implementing carrier aggregation (e.g., as used in cellular and other wireless systems), an OFDM based system implementing carrier aggregation, and/or the like. For example, a first portion of the optimal set of subcarriers can belong to (e.g., be associated with) a first frequency band and a second portion of the optimal set of subcarriers can belong to (e.g., be associated with) a second frequency band. The first frequency band can be contiguous and/or non-contiguous from the second frequency band. For example, non-contiguous frequency bands are separated by other frequency bands (e.g., sections of frequency spectrum). Contiguous frequency bands are not separated by other frequency bands. For example, contiguous frequency bands can share a common border within a frequency spectrum. The first frequency band and the second frequency band can be used to deliver data based on carrier aggregation. For example, carrier aggregation can comprise the use of multiple frequency bands to transmit data (e.g., at the same time or at different times). Performing (e.g., transmitting, providing) the data transmission to the plurality of devices via the optimal set of subcarriers can comprise performing (e.g., transmitting, providing) the data transmission via the first frequency band and second frequency band based on carrier aggregation. For example, a first portion of the data can be transmitted via the first frequency band, and a second portion of the data can be transmitted via the second frequency band. As a further example, determining the optimal set of subcarriers for (e.g., to carry) the data transmission based on the capacity reduction information comprises selecting between a first optimal set of subcarriers in the first frequency band and a second optimal set of subcarriers in the second frequency band.

In another aspect, the method 400 can be applied in the context of multiple bit rate transmissions. As an example, the method 400 can be applied individually for each of a plurality of data transmissions (e.g., the same content performed or provided at different bit rates). As another example, the data transmission can comprise a first transmission of a plurality of data transmissions based on scalable video coding. Determining (e.g., selecting) the optimal set of subcarriers can be performed for each of one or more of the plurality of data transmissions. Additionally, determining (e.g., selecting) the optimal set of subcarriers can be prioritized based on the data rate of the corresponding data transmissions of the plurality of data transmissions.

It should be noted that the method 400 can be applied repeatedly for a data transmission. For example, as the plurality of devices changes (e.g., new devices request the data transmission, some devices drop the data transmission), the capabilities of the plurality of devices changes, and/or network conditions change, the method 400 can be repeated to determine an updated optimal set of subcarriers (e.g., based on the update plurality of devices and/or capabilities thereof). The data transmission can be updated by changing the subcarriers used to carry the data transmission in response to updates to the optimal set of subcarriers.

FIG. 5 is a flowchart illustrating an example method 500 for performing (e.g., transmitting, providing) data. At step 502, capability profiles for a plurality of devices requesting (e.g., or that requested) a data transmission can be accessed. For example, the capability profiles can be accessed from a local data store. As another example, the capability profiles can be requested, received, and/or accessed from each of the plurality of devices. The capability profiles can specify capabilities of the plurality of devices for corresponding subcarriers. The capability profiles can be specific to each of the plurality of devices (e.g., though some devices may have identical or similar capability profiles). The capability profiles can associate a plurality of available subcarriers with corresponding parameters (e.g., parameter values). The corresponding parameters (e.g., parameter values) can comprise modulation parameters, encoding parameters, error correction parameters, interleaving parameters, or a combination thereof. For example, the capability information can specify a modulation level (e.g., QAM 16, QAM 64, QAM 256, QAM 1024, QAM 4096, QAM 16K), modulation scheme, and/or the like for each subcarrier.

At step 504, the corresponding parameters (e.g. or parameter values) can be compared for one or more of the plurality of subcarriers. Comparing the parameter values of the capability profiles can comprise determining, for each subcarrier of the plurality of available subcarriers, an amount of similarity between one or more of the parameter values associated with the respective subcarrier in the capability profiles. For example, similarity or difference between the corresponding parameters (e.g., parameter values) of the capability profiles can be determined for each of at least a portion of the available subcarriers. The similarity or difference can comprise an amount of bit capacity (e.g., or modulation level) similarity or difference between a first portion of the plurality of devices and a second portion of the plurality of devices. For example, the bit capacity can correspond to a first parameter (e.g., first modulation level, lowest modulation level assigned to a respective subcarrier among the plurality of devices). The first portion of the plurality devices can support parameters (e.g., modulation levels) that have higher values (e.g., higher complexity, higher bit rate) than the first parameter. Accordingly, if the first portion of the plurality of devices receives the data transmission based on the first parameter (e.g., at the first modulation level), then the first portion of the plurality of devices may experience capacity loss because the first portion of the plurality of devices can perform (e.g., transmit, provide) the data transmission based on higher parameter values (e.g., higher modulation levels) than the first parameter (e.g., first modulation level). Thus, the similarity or difference can be determined by subtracting the parameter (e.g., modulation level) corresponding to each of the first portion of the plurality of devices from the first parameter (e.g., first modulation level).

In another aspect, the similarity or difference can be determined based on comparison of maximum parameter values to minimum parameter values among devices for corresponding subcarriers. For example, determining similarity or difference for each of the available subcarriers can comprise determining, for each device of the plurality of devices, the corresponding parameter for a first subcarrier of the available subcarriers. Additionally, a minimum parameter value for the first subcarrier and a maximum parameter value for the first subcarrier can be determined from the parameters of the plurality of devices corresponding to the first subcarrier. The minimum parameter can be subtracted from the maximum parameter. A difference can be calculated, for the first subcarrier, as result of subtracting the minimum parameter from the maximum parameter.

At step 506, an optimal set of subcarriers for performing (e.g., transmitting, providing) a data transmission to the plurality of devices can be determined (e.g., selected). For example, the optimal set of subcarriers can be determined based on the comparison of the parameters (e.g., parameter values). The optimal set of subcarriers can be determined (e.g., selected) based on similarity of the corresponding parameters among the capability profiles for the corresponding subcarriers. For example, one or more (or each) of the available subcarriers can be ranked, prioritized, and/or the like based on the similarity or difference (e.g., capacity loss) determined in step 506. The subcarriers with the highest ranking (e.g., greatest similarity, lowest difference, lowest capacity loss) can be determined (e.g., selected) as the optimal set of subcarriers. In an aspect, the optimal set of subcarriers can be determined (e.g., selected) based on the data rate of the data transmission. For example, each of the subcarriers can be configured to provide a certain amount of data. Accordingly, the optimal set of subcarriers can be determined (e.g., selected) such that data capacity of the subcarriers is not wasted. The optimal set of subcarriers can be determined (e.g., selected) such that the data capacity of the optimal set of subcarriers is enough for the data rate of the data transmission.

In an aspect, determining (e.g., selecting) the optimal set of subcarriers for performing (e.g., transmitting, providing) the data transmission can comprise determining, for each subcarrier of the available subcarriers, a capacity loss based on similarity or differences between the corresponding parameters (e.g., parameter values) of each of the capability profiles. The optimal set of subcarriers can comprise subcarriers from the available subcarriers that minimize the capacity loss. In another aspect, determining (e.g., selecting) the optimal set of subcarriers for performing (e.g., providing, transmitting) the data transmission to the plurality of devices can comprise determining (e.g., selecting) subcarriers from the available subcarriers (e.g., that have corresponding parameters among the plurality of capability profiles) that have a similarity (e.g., an amount of similarity) within a similarity threshold.

At step 508, the data transmission can be performed (e.g., provided, transmitted) to the plurality of devices via the optimal set of subcarriers. For example, the data transmission can be multicast, broadcast, unicast and/or the like to the plurality of devices. In an aspect, the data transmission can comprise content, such as video, audio, text, and/or the like. The content can comprise and/or represent a live event (e.g., sports game, live show, newscast), video on demand content, and/or the like. The data transmission and/or the content can be requested by each of the plurality of devices. The plurality of devices can comprise computing devices, televisions, mobile devices (e.g., cell phones, tablets), smart devices, (e.g., smart glasses, smart apparel, smart watch), set top boxes, and/or the like as further described herein. The data transmission can be multicast to the plurality of devices via DOCSIS, OFDM based protocol, home plug, LTE carrier aggregation, MoCA, or a combination thereof.

In an aspect, the method 500 can further comprise adjusting an encoding parameter (e.g., encoding parameter value), modulation parameter (e.g., modulation parameter value), or a combination thereof to accommodate a limitation of the optimal set of subcarriers. The data transmission can be encoded based on the adjusted encoding parameter, modulated based on the adjusted modulation parameter, and/or a combination thereof before the performing of the data transmission. For example, the limitation can comprise a bit rate limitation. For example, the optimal set of subcarriers may be configured to provide data with a total bit rate that is less than the requested data transmission. An encoding instruction can be sent to an encoder (e.g., encoder 112) to decrease the bit rate of the data transmission to accommodate the total bit rate supported by the optimal set of subcarriers.

In an aspect, the method 500 can be applied in the context of carrier aggregation, such as a wireless communication system (e.g., cell phone communication system) implementing carrier aggregation (e.g., as used by cellular and other wireless systems), an OFDM based system implementing carrier aggregation, and/or the like. For example, a first portion of the optimal set of subcarriers can belong to (e.g., be associated with) a first frequency band and a second portion of the optimal set of subcarriers can belong to (e.g., be associated with) a second frequency band. The first frequency band can be contiguous and/or non-contiguous from the second frequency band. For example, non-contiguous frequency bands are separated by other frequency bands (e.g., sections of frequency spectrum). Contiguous frequency bands are not separated by other frequency bands. For example, contiguous frequency bands can share a common border within a frequency spectrum. The first frequency band and the second frequency band can be used to deliver data based on carrier aggregation. For example, carrier aggregation can comprise the use of multiple frequency bands to transmit data (e.g., at the same time or at different times). Performing (e.g., transmitting, providing) the data transmission to the plurality of devices via the optimal set of subcarriers can comprise performing (e.g., transmitting, providing) the data transmission via the first frequency band and second frequency band based on carrier aggregation. For example, a first portion of the data can be transmitted via the first frequency band, and a second portion of the data can be transmitted via the second frequency band. As a further example, determining the optimal set of subcarriers to carry the data transmission based on the capacity reduction information can comprise selecting between a first optimal set of subcarriers in the first frequency band and a second optimal set of subcarriers in the second frequency band.

In another aspect, the method 500 can be applied in the context of multiple bit rate transmissions. As an example, the method 500 can be applied individually for each of a plurality of data transmissions (e.g., of the same content provided at different bit rates). As another example, the data transmission can comprise a first transmission of a plurality of data transmissions based on scalable video coding. Determining (e.g., selecting) the optimal set of subcarriers can be performed for each of one or more of the plurality of data transmissions. Additionally, determining (e.g., selecting) the optimal set of subcarriers can be prioritized based on the data rate of the corresponding data transmissions of the plurality of data transmissions.

It should be noted that the method 500 can be applied repeatedly for a data transmission. For example, as the plurality of devices changes (e.g., new devices request the data transmission, some devices drop the data transmission), the capabilities of the plurality of devices changes, and/or network conditions change, the method 500 can be repeated to determine an updated optimal set of subcarriers (e.g., based on the update plurality of devices and/or capabilities thereof). The data transmission can be updated by changing the subcarriers used to carry the data transmission in response to updates to the optimal set of subcarriers.

FIG. 6 is a flowchart illustrating yet another example method 600 for performing (e.g., providing, transmitting) data. At step 602, a plurality of capability profiles can be accessed. The plurality of capability profiles can associate a plurality of available subcarriers with corresponding parameters (e.g., parameter values). The plurality of capability profiles can comprise predefined or dynamically generated capability profiles for an orthogonal frequency division multiplexing based communication system. For example, the plurality of capability profiles can be accessed from a local data store. As another example, the plurality of capability profiles can be requested, received, and/or accessed from each of a plurality of devices. The plurality of capability profiles can specify capabilities of the plurality of devices for corresponding subcarriers. The plurality of capability profiles can be specific to each of the plurality of devices (e.g., though some devices may have identical or similar capability profiles). The plurality of capability profiles can associate a plurality of available subcarriers with corresponding parameters (e.g., parameter values). The corresponding parameters can comprise modulation parameters (e.g., modulation parameter values), encoding parameters (e.g., encoding parameter values), error correction parameters (e.g., error correction parameter values), interleaving parameters (e.g., interleaving parameter values), or a combination thereof. For example, the capability information can specify a modulation level (e.g., QAM 16, QAM 64, QAM 256, QAM 1024, QAM 4096, QAM 16K), modulation scheme, and/or the like for each subcarrier.

In an aspect, similarity or difference between the corresponding parameters (e.g., parameter values) of the plurality of capability profiles can be determined for each of at least a portion of the available subcarriers. The similarity or difference can comprise an amount of bit capacity (e.g., or modulation level) similarity or difference between a first portion of the plurality of devices and a second portion of the plurality of devices. For example, the bit capacity for a particular subcarrier of the first portion of the plurality of capability profiles can correspond to a first parameter (e.g., first modulation level, lowest modulation level assigned to a respective subcarrier among the plurality of capability profiles). The second portion of the plurality of capability profiles can specify parameters (e.g., modulation levels) which have higher values (e.g., higher complexity, higher bit rate) than the first parameter. Thus, the similarity or difference (e.g., for a particular subcarrier) can be determined by subtracting the first parameter (e.g., modulation level) from the corresponding parameters of the second portion of the plurality of capability profiles.

In another aspect, the similarity or difference can be determined based on comparison of maximum parameter values to minimum parameter values among the plurality of capability profiles for corresponding subcarriers. For example, determining similarity or difference for each of the available subcarriers can comprise determining, for each capacity profile of the plurality of capacity profiles, the corresponding parameter for a first subcarrier of the available subcarriers. Additionally, a minimum parameter value for the first subcarrier and a maximum parameter value for the first subcarrier can be determined from the parameters of the plurality of capability profiles. The minimum parameter can be subtracted from the maximum parameter (e.g., for a particular subcarrier). A difference can be calculated, for the first subcarrier, as result of subtracting the minimum parameter from the maximum parameter.

At step 604, at least one group of optimal subcarriers can be determined (e.g., selected) from among the available subcarriers. The at least one group of optimal subcarriers can be determined based on a comparison, for one or more of the available subcarriers, of the parameters values of the plurality of capability profiles. For example, the at least one group of optimal subcarriers can be determined (e.g., selected) based on similarity (e.g., an amount of similarity) of the corresponding parameters among the capability profiles for the corresponding subcarriers. For example, one or more (or each) of the available subcarriers can be ranked, prioritized, and/or the like based on the determined similarity or difference (e.g., capacity loss). The subcarriers with the highest ranking (e.g., greatest similarity, lowest difference, lowest capacity loss) can be determined (e.g., selected) as the at least one group of optimal subcarriers.

In an aspect, determining (e.g., selecting) the at least one group of optimal of subcarriers can comprise determining (e.g., selecting) subcarriers from the available subcarriers that have corresponding parameters (e.g., parameter values) among the plurality of capability profiles that have a similarity (e.g., amount of similarity) within a similarity threshold. In another aspect, determining (e.g., selecting) the at least one group of optimal subcarriers can comprise determining, for each subcarrier of the available subcarriers, a capacity loss based on differences between the corresponding parameters (e.g., parameter values) of each of the capability profiles. The at least one group of optimal subcarriers can comprise subcarriers from the available subcarriers that minimize the capacity loss. As a further example, determining the at least one group of optimal subcarriers can comprise determining, for each subcarrier of the plurality of available subcarriers, an amount of similarity between one or more of the parameter values associated with the respective subcarrier in the capability profiles. Subcarriers from the plurality of available subcarriers that have the amount of similarity within a similarity threshold can be determined.

At step 606, a first transmission group that comprises the at least one group of optimal subcarriers can be determined. For example, the at least one group of optimal subcarriers can be assigned as a first transmission group. For example, the first transmission group can comprise a first multicast transmission group, a first unicast transmission group, a first broadcast transmission group, and/or the like. In as aspect, the at least one group of optimal subcarriers can be assigned in a file, such as a configuration file, setting, and/or the like of a modulator, encoder, and/or the like. In an aspect, the plurality of capability profiles can be updated based on the determining of the at least one group of optimal subcarriers as the first transmission group (e.g., multicast transmission group). For example, a setting, parameter, and/or the like can be updated in the capability profile thereby identifying the at least one group of optimal subcarriers.

At step 608, a data transmission can be performed (e.g., transmitted, provided) via the first transmission group. The data transmission can comprise a multicast data transmission, broadcast data transmission, unicast data transmission, a combination thereof, and/or the like. For example, the data transmission can be multicast, broadcast, unicast and/or the like to the plurality of devices. In an aspect, the data transmission can comprise content, such as video, audio, text, and/or the like. The content can comprise and/or represent a live event (e.g., sports game, live show, newscast), video on demand content, and/or the like. The data transmission and/or the content can be requested by each of the plurality of devices. The plurality of devices can comprise computing devices, televisions, mobile devices (e.g., cell phones, tablets), smart devices, (e.g., smart glasses, smart apparel, smart watch), set top boxes, and/or the like as further described herein. The data transmission can be multicast to the plurality of devices via DOCSIS, OFDM based protocol, home plug, LTE carrier aggregation, MoCA, or a combination thereof.

In an aspect, the method 600 can further comprise adjusting an encoding parameter (e.g., encoding parameter value), modulation parameter (e.g., modulation parameter value), or a combination thereof to accommodate a limitation of the optimal set of subcarriers. For example, the limitation can comprise a bit rate limitation. For example, the optimal set of subcarriers may be configured to provide data with a total bit rate that is less than the requested data transmission. An encoding instruction can be sent to an encoder (e.g., encoder 112) to decrease the bit rate of the data transmission to accommodate the total bit rate supported by the optimal set of subcarriers.

In an aspect, the method 600 can be applied in the context of carrier aggregation, such as a wireless communication system (e.g., cell phone communication system) implementing carrier aggregation (e.g., as used in cellular and other wireless systems), an OFDM based system implementing carrier aggregation, and/or the like. For example, a first portion of the optimal set of subcarriers can belong to (e.g., be associated with) a first frequency band and a second portion of the optimal set of subcarriers can belong to (e.g., be associated with) a second frequency band. The first frequency band can be contiguous and/or non-contiguous from the second frequency band. For example, non-contiguous frequency bands are separated by other frequency bands (e.g., sections of frequency spectrum). Contiguous frequency bands are not separated by other frequency bands. For example, contiguous frequency bands can share a common border within a frequency spectrum. The first frequency band and the second frequency band can be used to deliver data based on carrier aggregation. For example, carrier aggregation can comprise the use of multiple frequency bands to transmit data (e.g., at the same time or at different times). Performing (e.g., providing, transmitting) the data transmission to the plurality of devices via the optimal set of subcarriers can comprise performing the data transmission via the first frequency band and second frequency band based on carrier aggregation. For example, a first portion of the data can be transmitted via the first frequency band, and a second portion of the data can be transmitted via the second frequency band. As a further example, determining the optimal set of subcarriers to carry the data transmission based on the capacity reduction information can comprise selecting between a first optimal set of subcarriers in the first frequency band and a second optimal set of subcarriers in the second frequency band.

In another aspect, the method 600 can be applied in the context of multiple bit rate transmissions. As an example, the method 600 can be applied individually for each of a plurality of different data transmissions (e.g., the same content provided at different bit rates). As another example, the data transmission can comprise a first transmission of a plurality of data transmissions based on scalable video coding. A different group of optimal subcarriers can be determined (e.g., selected) for each of one or more of the plurality of data transmissions. Additionally, determining (e.g., selecting) the at least one group of optimal subcarriers can be prioritized based on the data rate of the corresponding data transmissions of the plurality of data transmissions.

It should be noted that the method 600 can be applied repeatedly (e.g., at predefined times, in response to a triggering condition). For example, as the plurality of capability profiles changes (e.g., new capability profiles are added, capability profiles are updated or removed), the method 600 can be repeated to determine updated groups of optimal subcarriers. The data transmission can be updated by changing the subcarriers used to carry the data transmission in response to updates to the at least one group of optimal subcarriers.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, from a device, a request for data;
    determining, based on the request, capability information associated with the device;
    determining, based on the capability information associated with the device, a first set of subcarriers associated with the device;
    sending, via the first set of subcarriers, a first portion of the data;
    receiving, from the device, an updated request for the data;
    determining, based on the updated request for the data and the capability information associated with the device, an updated set of subcarriers associated with the device; and
    sending, via the updated set of subcarriers, based on the updated request for the data, a second portion of the data.

2. The method of claim 1, wherein the data comprises a multicast transmission associated with one or more of audio content and video content.

3. The method of claim 1, wherein the capability information comprises at least one of: a modulation level the device can demodulate, a modulation level the device can modulate, an error correction capability, deinterleaving information, a modulation error ratio (MER), a signal-to-noise ratio (SNR), or an error vector magnitude (EVM).

4. The method of claim 1, wherein the first set of subcarriers is associated with a base transmission rate and the updated set of subcarriers is associated with an additional transmission rate and wherein the updated set of subcarriers associated with the additional transmission rate is lower priority than the first set of subcarriers associated with the base transmission rate.

5. The method of claim 4, wherein the base transmission rate is lower than the additional transmission rate.

6. The method of claim 1, wherein the first set of subcarriers is associated with a lower modulation level and the updated set of subcarriers is associated with a higher modulation level.

7. The method of claim 1, wherein sending, via the first set of subcarriers, the first portion of the data comprises sending the first portion of the data as a plurality of data transmissions associated with a first transmission rate and wherein sending, via the updated set of subcarriers, the second portion of the data as a plurality of data transmissions associated with a second transmission rate.

8. A method comprising:
receiving, from a device, a request for data wherein the request is associated with a requested transmission rate
determining, based on the requested transmission rate, a first set of subcarriers associated with a base transmission rate and a second set of subcarriers associated with an additional transmission rate, wherein the base transmission rate and the additional transmission rate combined satisfy the requested transmission rate;
sending, to the device, a base portion of the data via the first set of subcarriers associated with the base transmission rate; and
sending, to the device, an additional portion of the data via the second set of subcarriers associated with the additional transmission rate.

9. The method of claim 8, wherein the data comprises a multicast scalable video coding transmission.

10. The method of claim 9, wherein the base portion of the data comprises a base layer of the multicast scalable video coding transmission and wherein the additional portion of the data comprises one or more enhancement layers of the multicast scalable video coding transmission.

11. The method of claim 8, wherein the base portion of the data causes the device to output video content at a low resolution and the additional portion of the data causes the device to output the video content at a high resolution.

12. The method of claim 8, wherein the request indicates a parameter value for each of the first set of subcarriers and the second set of subcarriers, and wherein the parameter value relates to at least one of: a transmission rate, a video resolution, a modulation level, and a demodulation level.

13. The method of claim 8, wherein the second set of subcarriers associated with the additional transmission rate is lower priority than the first set of subcarriers associated with the base transmission rate.

14. The method of claim 8, wherein the first set of subcarriers is associated with a lower modulation level and the second set of subcarriers is associated with a higher modulation level.

15. The method of claim 8, wherein sending the base portion of the data and the additional portion of the data comprises sending the base portion of the data and the additional portion of the data via quadrature amplitude modulation.

16. The method of claim 8, further comprising:
discontinuing, based on a change in a network characteristics, sending the additional portion of the data via the second set of subcarriers.

17. An apparatus comprising:
one or more processors; and
a memory storing processor-executable instructions that, when executed by the one or more processors, cause the apparatus to:
receive, from a device, a request for data;
determine, based on the request, capability information associated with the device;
determine, based on the capability information associated with the device, a first set of subcarriers associated with the device;
send, via the first set of subcarriers, a first portion of the data;
receive, from the device, an updated request for the data;
determine, based on the updated request for the data and the capability information associated with the device, an updated set of subcarriers associated with the device; and
send, via the updated set of subcarriers, based on the updated request for the data, a second portion of the data.

18. The apparatus of claim 17, wherein the data comprises a multicast transmission associated with one or more of audio content and video content.

19. The apparatus of claim 17, wherein the capability information comprises at least one of: a modulation level the device can demodulate, a modulation level the device can modulate, an error correction capability, deinterleaving information, a modulation error ratio (MER), a signal-to-noise ratio (SNR), or an error vector magnitude (EVM).

20. The apparatus of claim 17, wherein the first set of subcarriers is associated with a base transmission rate and the updated set of subcarriers is associated with an additional transmission rate and wherein the updated set of subcarriers associated with the additional transmission rate is lower priority than the first set of subcarriers associated with the base transmission rate.

21. The apparatus of claim 20, wherein the base transmission rate is lower than the additional transmission rate.

22. The apparatus of claim 17, wherein the first set of subcarriers is associated with a lower modulation level and the updated set of subcarriers is associated with a higher modulation level.

23. The apparatus of claim 17, wherein the processor-executable instructions that, when executed by the one or more processors, cause the apparatus to send, via the first set of subcarriers, the first portion of the data, further cause the apparatus to send the first portion of the data as a plurality of data transmissions associated with a first transmission rate and wherein the processor-executable instructions that, when executed by the one or more processors, cause the apparatus to send, via the updated set of subcarriers, the second portion of the data, further cause the apparatus to send the second portion of the data as a plurality of data transmissions associated with a second transmission rate.

24. An apparatus comprising:
one or more processors; and a memory storing processor-executable instructions that, when executed by the one or more processors, cause the apparatus to:
  receive, from a device, a request for data wherein the request is associated with a requested transmission rate;
  determine, based on the requested transmission rate, a first set of subcarriers associated with a base transmission rate and a second set of subcarriers associated with an additional transmission rate, wherein the base transmission rate and the additional transmission rate combined satisfy the requested transmission rate;
  send, to the device, a base portion of the data via the first set of subcarriers associated with the base transmission rate; and
  send, to the device, an additional portion of the data via the second set of subcarriers associated with the additional transmission rate.

25. The apparatus of claim 24, wherein the data comprises a multicast scalable video coding transmission.

26. The apparatus of claim 25, wherein the base portion of the data comprises a base layer of the multicast scalable video coding transmission and wherein the additional portion of the data comprises one or more enhancement layers of the multicast scalable video coding transmission.

27. The apparatus of claim 24, wherein the base portion of the data causes the device to output video content at a low resolution and the additional portion of the data causes the device to output the video content at a high resolution.

28. The apparatus of claim 24, wherein the request indicates a parameter value for each of the first set of subcarriers and the second set of subcarriers, and wherein the parameter value relates to at least one of: a transmission rate, a video resolution, a modulation level, and a demodulation level.

29. The apparatus of claim 24, wherein the second set of subcarriers associated with the additional transmission rate is lower priority than the first set of subcarriers associated with the base transmission rate.

30. The apparatus of claim 24, wherein the first set of subcarriers is associated with a lower modulation level and the second set of subcarriers is associated with a higher modulation level.

31. The apparatus of claim 24, wherein the processor-executable instructions that, when executed by the one or more processors, cause the apparatus to send the base portion of the data and the additional portion of the data cause the apparatus to send the base portion of the data and the additional portion of the data via quadrature amplitude modulation.

32. The apparatus of claim 24, wherein the processor-executable instructions, when executed by the one or more processors, further cause the apparatus to discontinue, based on a change in a network characteristics, sending the additional portion of the data via the second set of subcarriers.

* * * * *